March 24, 1959   L. W. CAMP   2,879,496
PLASTIC CAST RING STACK TRANSDUCER
Filed Sept. 30, 1948   6 Sheets-Sheet 1
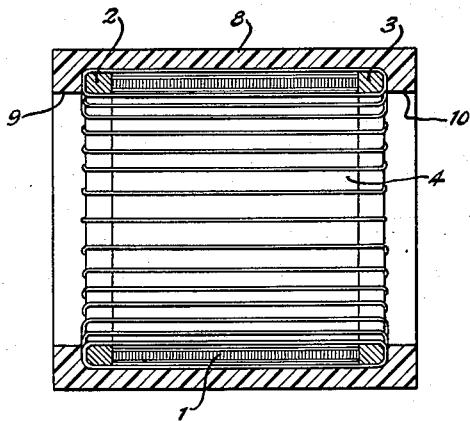
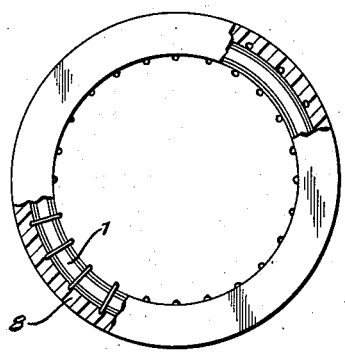
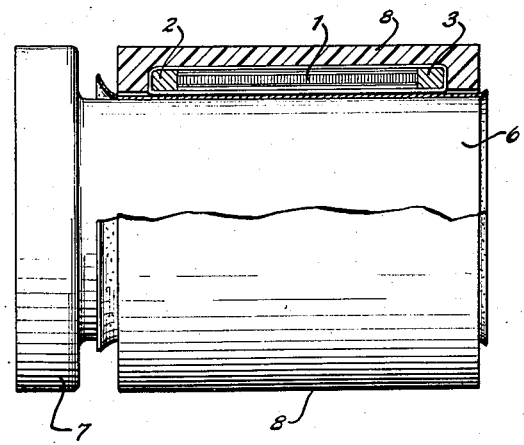
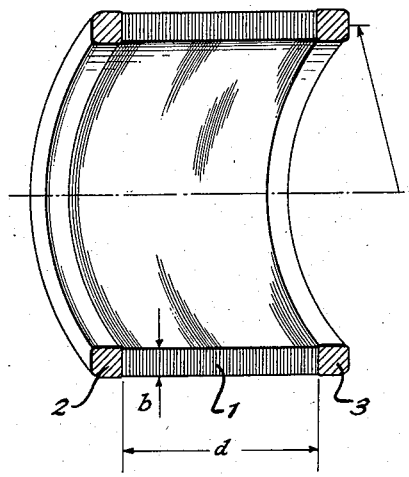
Inventor
LEON W. CAMP.
By
John B. Brady
ATTORNEY March 24, 1959 L. W. CAMP 2,879,496
PLASTIC CAST RING STACK TRANSDUCER
Filed Sept. 30, 1948 6 Sheets-Sheet 2

Inventor
LEON W. CAMP.
By
John B. Brady
ATTORNEY

March 24, 1959  L. W. CAMP  2,879,496
PLASTIC CAST RING STACK TRANSDUCER
Filed Sept. 30, 1948  6 Sheets-Sheet 3

INVENTOR.
LEON W. CAMP.
BY
John B. Brady
ATTORNEY

INVENTOR.
LEON W. CAMP.
BY
John B. Brady
ATTORNEY

United States Patent Office 2,879,496
Patented Mar. 24, 1959

2,879,496

PLASTIC CAST RING STACK TRANSDUCER

Leon W. Camp, State College, Pa., assignor, by mesne assignments, to Research Corporation, New York, N.Y., a corporation of New York Application September 30, 1948, Serial No. 51,953

3 Claims. (Cl. 340—11)

My invention relates broadly to magnetostrictive transducers, and more particularly to an improved construction of toroidal type of magnetostrictive transducers.

One of the objects of my invention is to provide a construction of toroidal magnetostrictive transducer which is especially adaptable to enclosure within a plastic body or shell.

A still further object of my invention is to provide an arrangement of mechanical protection means for a ring stack magnetostrictive transducer.

Still another object of my invention is to provide an improved method of enclosing a cylindrical construction of magnetostrictive transducer in which the transducer is cast within a shell of insulation material operative to protect the structure of the transducer while transmitting the vibrations incident to the operation of the transducer.

A still further object of my invention is to provide a construction of cylindrical magnetostrictive transducer including the means for protecting the transducer by an enclosing casting of synthetic resin or other synthetic insulation materials operative to transmit vibrations incident to the operation of the transducer.

Figure 4:
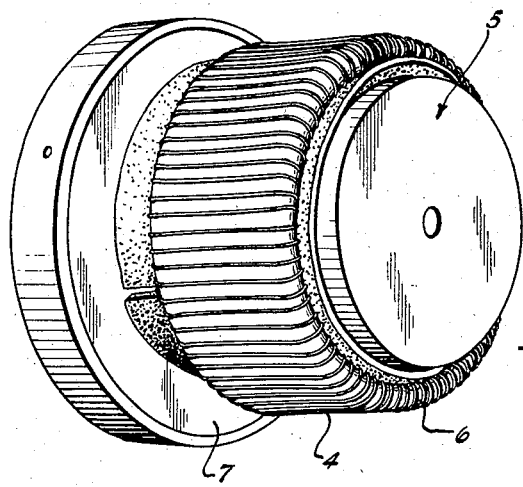
Figure 6:
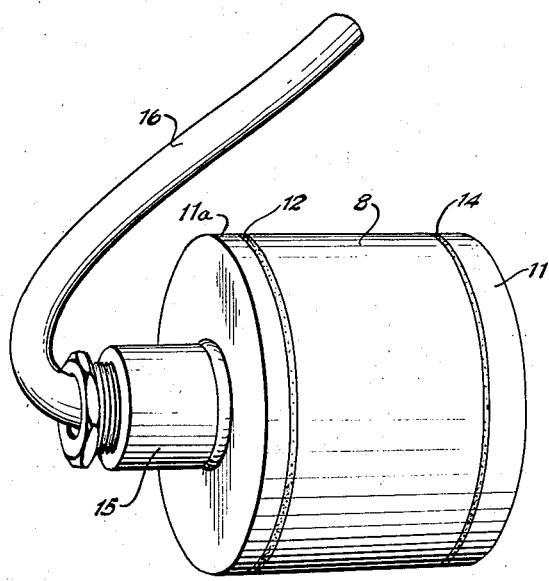
Figure 7:
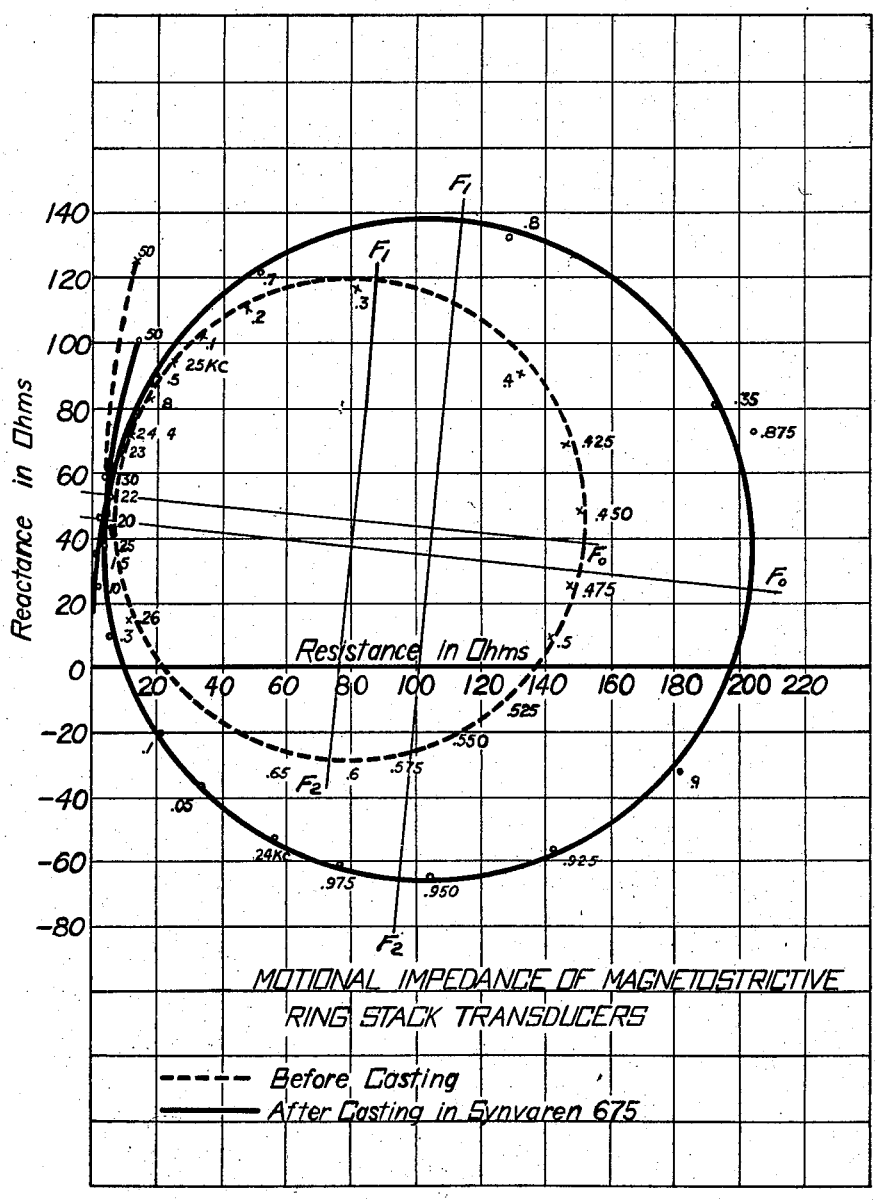
Figure 8:
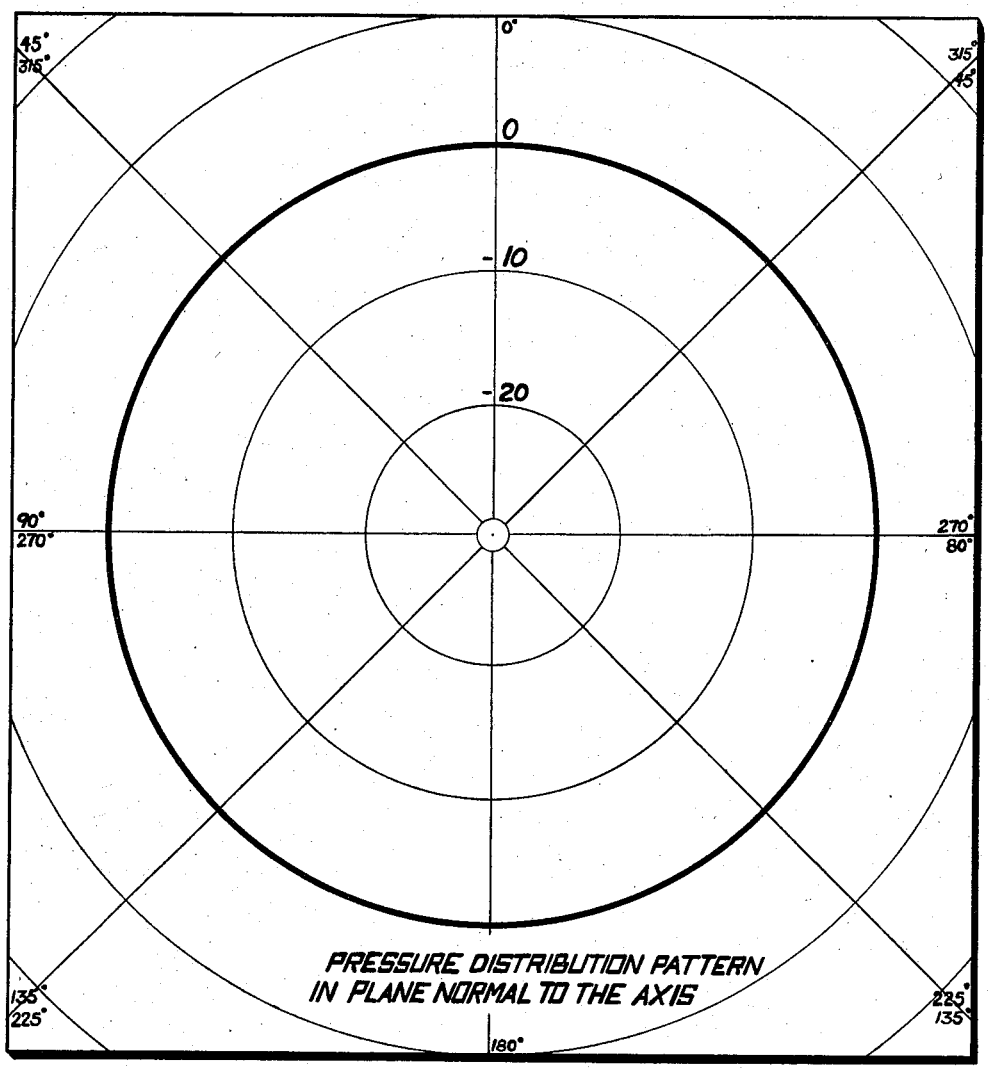
Figure 9:
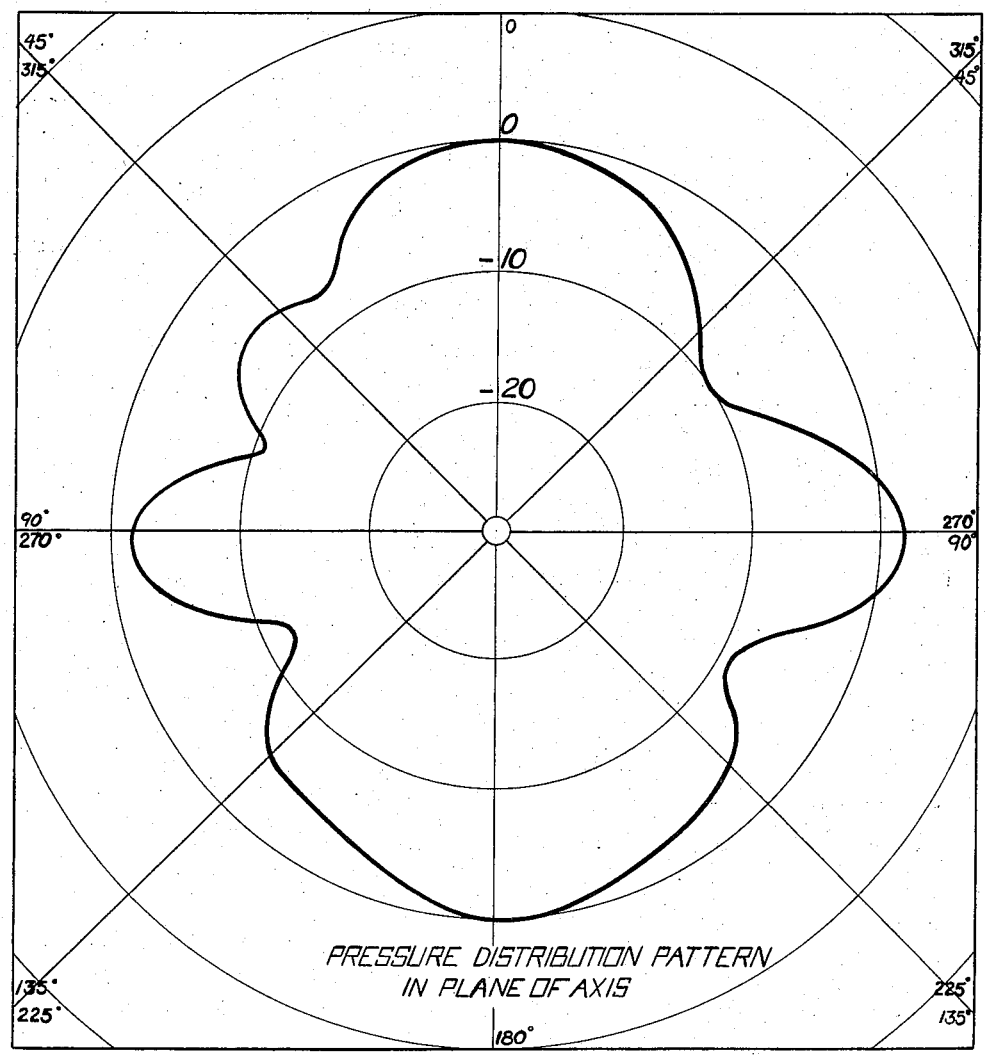
Figure 10:
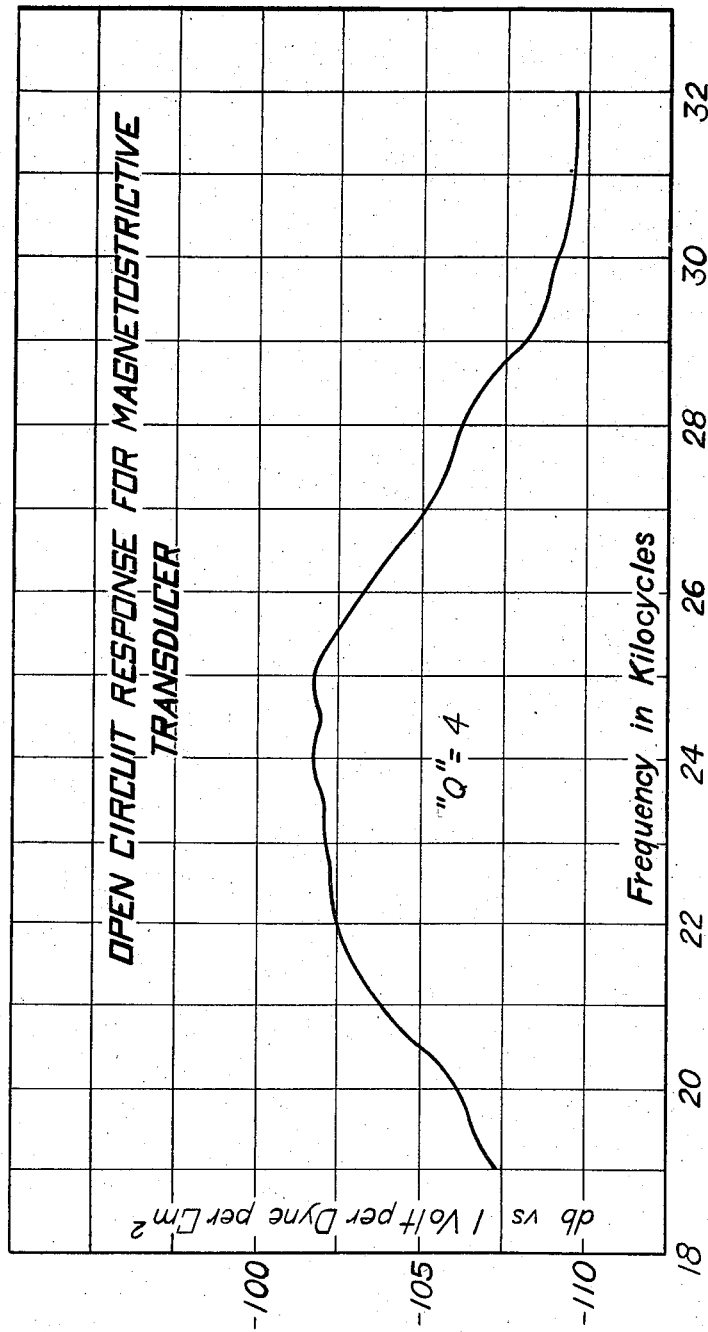

Other and further objects of my invention reside in a method of constructing a ring stack transducer and associating the transducer with a protective coating of molded insulation material, as set forth more fully in the specification hereinafter following, by reference to the accompanying drawings, in which:

Figure 1 is a vertical sectional view taken through a magnetostrictive transducer constructed in accordance with my invention and illustrating the protective covering of insulation material cast therearound; Fig. 2 is an end view of the magnetostrictive transducer shown in Fig. 1 and partially broken away and illustrated in section to show the arrangement of toroidal winding around the transducer; Fig. 3 is a partial perspective view of the ring stack employed in the magnetostrictive transducer of my invention; Fig. 4 is a perspective view of the casting spool employed in carrying out the method of my invention, and illustrating the magnetostrictive transducer mounted thereon according to my invention; Fig. 5 is a vertical sectional view of the transducer mounted in position preparatory to application of the protective molding of insulation material thereto; Fig. 6 is a perspective view of the completely assembled transducer constructed in accordance with my invention; Fig. 7 is a curve diagram showing the effects of motional impedance of the magnetostrictive ring stack transducer of my invention, tested both before and after the casting of the protective molding of insulation material thereon, and illustrating particularly the decrease in mechanical damping which results in the condition of the protective coating of insulation material; Fig. 8 is a typical pressure distribution pattern taken in a plane normal to the axis of the transducer; Fig. 9 shows a pressure distribution pattern taken in the plane of the axis of the transducer constructed in accordance with my invention; and Fig. 10 is a curve diagram showing a typical open circuit voltage response of a transducer constructed in accordance with my invention and operated in a sound field of variable frequency.

Referring to the drawings in more detail, reference character 1 designates a cylindrical stack of flat toroidal magnetostrictive rings. The cylindrical stack is built up as shown particularly in Fig. 3 of a multiplicity of annular laminations of magnetostrictive material cemented together to form a rigid structure. The cylindrical arrangement of magnetostrictive vibrator has a number of advantages in that it is relatively inexpensive, easy to build, and because of its cylindrical structure the device can develop a uniform sound pressure in one plane and yet have sufficient surface area to deliver considerable power. Also the cylindrical device operates very efficiently in the vicinity of resonance.

The ring stack constitutes a mechanical oscillator with an equivalent mass given by $2\pi rbd\sigma$ and a stiffness given by $$2\pi bd\frac{E}{r}$$

where $\sigma$ and $E$ are the density and Young's modulus respectively for the material. This oscillator shows a resonance at a frequency where the mean circumference of the ring is one wave length of sound in the material. Another advantage of the ring structure is that the sharpness of resonance is controlled by the ratio of $b$ to $r$ and is therefore readily variable.

The distribution of sound pressure in a free field surrounding a short ring stack acting as a sound source can be approximated fairly well by the pattern resulting from a line and a ring source at right angles. This distribution is symmetrical about the axis of the cylinder, provided the transmitting medium makes perfect contact with cylindrical surfaces and all parts of the vibrating surface are vibrating in phase with uniform amplitude. This symmetry is quite desirable in most applications of this transducer. Therefore, I have found it necessary to envelop the stack and its windings in a protective material which would also serve to transmit the motion of the stack to the medium.

The laminations constituting the magnetostrictive transducer are selected with sufficiently hard magnetic properties to permit the device to operate on magnetic remnance without the need for a polarizing current. In the particular example illustrated herein, I form the rings in the stack 1 from an alloy consisting of 2% vanadium, 49% iron, and 49% cobalt known as 2-V permandum. After magnetization with a force of 100 oersteds, it can be driven at remnance with an alternating magnetic flux of 14 to 15 oersteds without demagnetization. This amounts to 100 watts electrical input into a one-inch high stack resonant at 25 kc. The laminated structure is used to cut down eddy current losses and at 25 kc. the laminations may be of 10 mil thickness without serious loss. After annealing, the rings are sprayed with an insulating cement and consolidated into stacks of the desired height. After consolidation the stack of laminated rings is fitted with annular Bakelite winding caps as shown at 2 and 3 in the assembly of Fig. 1. It is best that these caps 2 and 3 be cemented directly to the laminations. The stack is then wound toroidally with bare enameled wire shown at 4 of a size determined by the desired input impedance and the available space. For instance, the rings described here were wound with 80 turns of #28 copper wire.

For casting, the stack is mounted on the casting spool 5, as shown in Fig. 4. This casting spool 5 consists of the cylindrical part 6 attached to the plate 7. A sleeve of gasket material similar to Corprene fills the space between cylinder 6 and the ring stack 1. This sleeve is coated on both sides with a heavy lubricant which helps form a good seal against the leakage of plastic between the cylinder 6 of spool 5, and the ring 1, and facilitates the removal of the spool after the casting. The plate 7 is used for aligning the casting in a chuck for machining.

There are two general types of resins available for forming a protective coat about the ring. The pressure molding type before use is in a powdered form. Under heat and pressure it becomes a liquid, and again solidifies on cooling. To cast with this resin, a mold large enough to take the assembly of Fig. 4 must be used, and the spool 5 modified to keep the material from being forced inside the ring by the high pressure. The other type of resin is a liquid that can be poured under vacuum into a form containing the ring and spool. Heat and accelerators cause these substances to polymerize into solids. In either case, after the casting is formed, it is mounted in a lathe and machined down to the proper size. The removal of the spool leaves a cylinder of the resin inclosing the ring stack. To give proper strength, the resin wall should be about a quarter of an inch in thickness. Since the windings are exposed on the inside of this cylinder, it must be fitted with water tight end caps and seal for the cable.

The plastic wall which is formed about the ring laminations 1 and about the turns of wire 4 thereon is represented at 8 in Figs. 1, 2, and 6. The plastic covering extends beyond the rings of laminations, and beyond the annular winding caps 2 and 3 thereon and terminates in inwardly directed flanges 9 and 10. The inside diameters of flanges 9 and 10 correspond with the inside diameter of the stack of laminations 1, as represented more clearly in Fig. 1. Plug-like end caps 11 and 11a, as shown in Fig. 6, fit into the opposite open ends of the cylindrical transducer in the nature of plugs, as illustrated more clearly in Fig. 6. A sealing material is used to close the joints at 12 and 14 between the plug-like end caps 11 and 11a and the plastic covering 8. The plug-like end cap 11a supports a centrally or axially disposed cable fitting 15 through which cable 16 extends forming electrical connection with the winding 4 on the toroidal stack of laminations.

In Fig. 7 I have shown the motional impedance circle in air produced by the toroidal stack 1 both before and after casting the stack in the insulation material. Various kinds of insulation material may be used such as Phenol Condensation Products, "Synvaren 675," "Marblette 3040," "Lucite," "Acme XK-31+rubber tube," "Neoprene Latex" and other insulation materials. The curves of Fig. 7 were obtained by operating the magnetostrictive ring stack transducer without the coating of insulation material, and then with the coating of insulation material. The particular curves shown were obtained when using "Synvaren 675." In this case the casting in the insulation material resulted in a decrease in mechanical damping of the device. The winding on the ring stack transducer was connected in a test circuit for obtaining the reactance-resistance characteristics in ohms as depicted in Fig. 7 where the characteristics before the casting within the insulation material are shown by the dotted line curve while the reactance-resistance characteristics after casting the winding within the insulation material is shown by the full line curve. Using this same magnetostrictive transducer molded in "Synvaren 675," a pressure distribution pattern was obtained in a plane normal to the axis of the transducer, as shown in Fig. 8.

The pressure distribution pattern in Fig. 8 in a plane normal to the axis of the transducer by actual measurement was determined to be uniform throughout the 360° around the axis of the transducer and at varying distances from the axis as a center, as shown. The average pressure readings were taken on the curve denoted as 0 around the center of the axis of the transducer. A pressure distribution pattern in the plane of the axis of the transducer was obtained as shown in Fig. 9. This pressure distribution pattern in the plane of the axis of the transducer shows the maximum amplitude of pressure coincidental with the direction of the axis of the transducer with a sharp decrease in the pressure distribution pattern toward the central transverse axis of the transducer where there is established transverse pressure effects substantially equivalent to the pressure effects longitudinally of the axis of the transducer, but sharper at the extreme limits at which the pressure characteristics of the transducer are effective.

In Figs. 8 and 9 the graduations on the radial axes indicate sound pressure levels in a given angular direction in decibels ($db$) above ($+$) and below ($-$) the maximum pressure level emitted by the transducer.

Fig. 10 shows the open circuit response for the magnetostrictive transducer constructed in accordance with my invention when operating in a sound field of variable frequency. The curve shows the pressure response at one volt per Dyne per square centimeter as compared to the frequency variation.

The following table sets forth data for comparison of transducers prepared with the material indicated. The Q given in this table is that taken from the motional impedance circle under no load, and gives some indication of the acoustic properties of the material.

| Manner of Casting | Q | P.E., Percent | Efficiency, Percent |
|---|---|---|---|
| Before Casting | 82 | 72.5 | |
| "Synvaren 675" | 125 | 81 | 66.5 |
| "Marblette 3040" | 36 | 54 | 34 |
| "Lucite" | 26 | 49 | 39 |
| "Acme XK-31+rubber tube" | 66 | 65 | 51 |
| "Neoprene Latex" | 54 | 56 | 37 |

The transducers listed in the foregoing table were designed for a low operating Q in water rather than for maximum efficiency, which accounts for their failure to realize their potential efficiency. The efficiencies are determined from measurements of acoustical output and electrical input. The potential efficiency as shown above can be regarded as a figure of merit for the transducer. It is the efficiency which would be realized by the transducer with perfect match of impedance to the transmitting medium.

Both the Q and the potential efficiency of a transducer may be obtained from the curves of Fig. 7. In these curves the resistive and reactive components of the impedance of the transducer are plotted in terms of frequency of operation as a parameter, the frequency being noted numerically beside each plotted point. Since the portions of the curves which are of interest closely approximate circles, they are known generally as impedance circles, and, in the discussion which follows, are treated geometrically as such.

The Q of the transducer is determined as follows: It will be noted that on each circle there is a range along the right hand edge of the circle in which there is a maximum circumferential arc length for equal increments of frequency change. The actual maximum occurs at the resonant frequency of the transducer. The point at which this maximum occurs (in this case between 23.875 kc. and 23.900 kc. on the solid circle) is estimated or measured on frequency response curves similar to Fig. 10, and a diameter of the circle is constructed through this point. Perpendicular to the mid-point of this first diameter there is constructed a second diameter, the points of intersection of this second diameter with the circle being referred to as $F_2$ and $F_1$ and falling in this case at approximately 23.96 kc. and 23.78 kc., respectively. Q is determined by the equation $$Q = \frac{F_0}{F_2 - F_1}$$

This Q has physically the same significance as the Q of a circuit determined from a standard frequency response curve such as is illustrated in Fig. 10. The data of Fig. 10, however, were obtained with the transducer operating in water while the data of Fig. 7 were obtained with the transducer operating in air, the physical surroundings accounting for the difference in Q.

There are other geometrical means of obtaining Q from the impedance circles but this is one of the simplest. Since rather rough interpolation is involved in reading most of the figures along the arc of the circle and along the diameter a small variation in any one of these interpolations will cause appreciable variation in the value of Q arrived at. The illustration cited above is shown in Fig. 7.

The potential efficiency (PE) of the transducer is determined from the equation:

$$PE = \frac{\frac{R_{max}}{R_{min}} - 1}{\frac{R_{max}}{R_{min}} + 1}$$

where $R_{max}$ is the maximum value of the resistive components of the transducer impedance (the resistive coordinate of the right hand end of a horizontal diameter of the circle), in the case of a solid circle of Fig. 7 approximately 205 ohms, and $R_{min}$ is the minimum resistive component on the circle, in this case approximately 3 or 4 ohms. This quantity PE is an efficiency theoretically obtainable under ideal loading conditions of the transducer, conditions which are realized under neither water nor air loading. In fact, transducers designed for maximum PE have very poor Q and most designs represent compromises between these two quantities.

A number of castings were made in the phenol-formaldehyde type resin having the trade name, "Synvaren 675," with consistent success. Figs. 7, 8, and 9 show data typical of these transducers. Another successful transducer is that listed in the table as "Acme XK–31+rubber tube." This was made by placing a loose fitting rubber tube around the assembly of Fig. 4, pouring in a consolidating varnish having the trade name "Acme XK–31," applying the vacuum for about an hour, and then curing with heat. "Acme XK–31" is a material having very poor elastic properties but it adheres well to rubber and a thin layer does not greatly attenuate the sound to be transmitted. These experiments were conducted with a transducer resonant at 25 kc. At 60 kc. it was found that "Marblette 3040" was superior to "Synvaren 675."

These developments show that with the proper care transducers can be cast and mounted in plastic materials without a loss in efficiency. The construction is simple and the space occupied by the transducer is considerably less than that required by the castor oil filled type.

I have found the plastic cast ring stack transducer of my invention very effective in operation. The synthetic resin which is cast around the outside of the cylindrical transducer forms a layer approximately ¼" in thickness exteriorly of the transducer. There is no coating other than the stack bonding material on the inside of the cylinder. The plugs 10 and 11 at each end of the transducer serve to protect the inside of the transducer and the turns 8 of the winding thereon.

The enclosed transducer has many applications including the establishment of high frequency vibrations in fluids adapted for washing operations.

While I have described my invention in one of its preferred embodiments, I realize that modifications and changes may be made and I desire that it be understood that no limitations upon my invention are intended other than may be imposed by the scope of the appended claims.

What I claim as new and desire to claim by Letters Patent of the United States is as follows:

1. A ring stack transducer comprising a multiplicity of laminated rings of magnetostrictive material disposed in a stack forming a cylindrical toroid, ring members of insulation material aligned with each end of said cylindrical toroid, a coating of stack bonding material formed interiorly of said laminated rings for maintaining said rings in said cylindrical toroid, an electromagnetic winding having the turns thereof threading through said cylindrical toroid and around said ring members, a homogeneous mass of insulation material extending around opposite ends of said ring members and over the ends of the exterior portions of the winding on said cylindrical toroid and terminating in internal cylindrical bores at each end thereof substantially aligned with the interior portions of the turns of said electromagnetic winding, plug members of insulation material closing each end of said mass of insulation material and said cylindrical toroid and spaced from the ends of said electromagnetic winding by the homogeneous mass of insulation material which extends over the turns of said winding.

2. A ring stack transducer comprising a multiplicity of laminated rings of magnetostrictive material disposed in a stack forming a cylindrical toroid, a coating of stack bonding material formed interiorly of said laminated rings for maintaining said rings in the form of said cylindrical toroid, an electromagnetic winding having the turns thereof threading through said cylindrical toroid in the direction of the axis thereof, a homogeneous mass of insulation material extending over the exterior portions of the turns of said electromagnetic winding and around the end portions of the said turns and terminating in inwardly directed flanges spacing the end portions of said turns from the terminating peripheral ends of said homogeneous mass of insulation material, flat closure plates extending diametrically across each end of said cylindrical toroid and extending into the inwardly directed flanges therein, a cable fitting mounted centrally of one of said closure plates, and a connecting cable extending through said cable fitting and establishing connection with said electromagnetic winding.

3. A ring stack transducer comprising a multiplicity of laminated rings of magnetostrictive material disposed in a stack forming a cylindrical toroid, a coating of stack bonding material formed interiorly of said laminated rings for maintaining said rings in the form of said cylindrical toroid, an electromagnetic winding having the turns thereof threading through said cylindrical toroid in the direction of the axis thereof, a homogeneous mass of insulation material extending over the exterior portions of the turns of said electromagnetic winding and around the end portions of the said turns and terminating in inwardly directed flanges spacing the end portions of said turns from the terminating peripheral ends of said homogeneous mass of insulation material, flat closure plates extending diametrically across each end of said cylindrical toroid and extending into the inwardly directed flanges therein, means sealing said closure plates to the terminating peripheral ends of homogeneous mass of insulation material, and means extending through one of said closure plates for establishing electrical connection with said electromagnetic winding.

References Cited in the file of this patent

UNITED STATES PATENTS

| | | |
|---|---|---|
| 2,005,741 | Hayes | June 25, 1935 |
| 2,076,330 | Wood et al. | Apr. 6, 1937 |
| 2,328,496 | Rocard | Aug. 31, 1943 |
| 2,438,925 | Krantz | Apr. 6, 1948 |
| 2,438,926 | Mott | Apr. 6, 1948 |
| 2,480,535 | Alois et al. | Aug. 30, 1949 |